Figure 1:
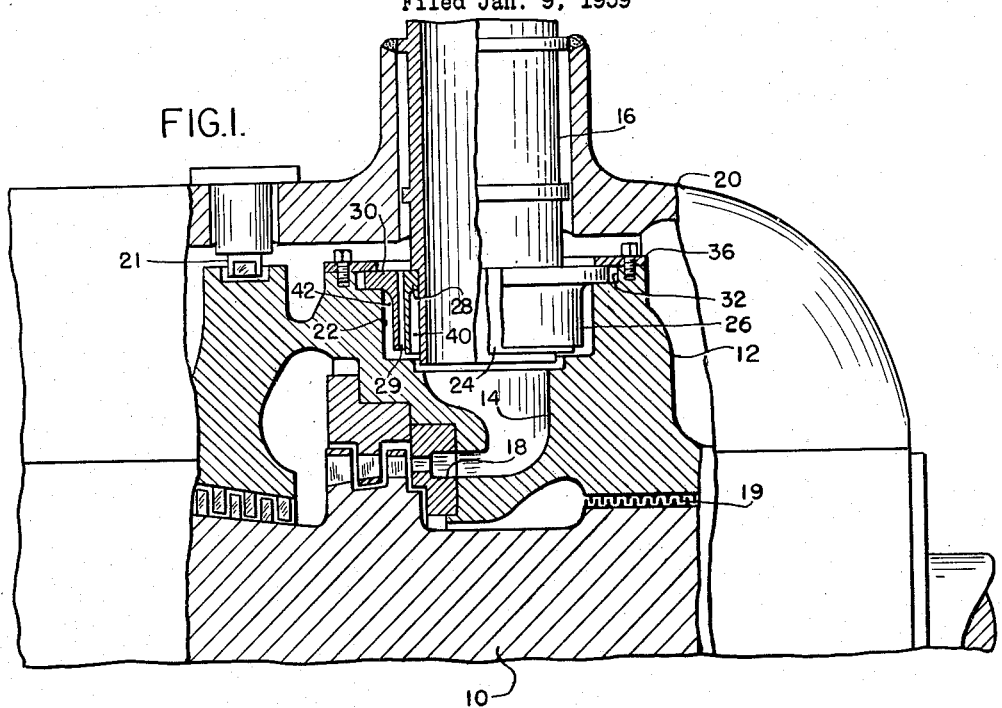

Aug. 15, 1961 M. SAJBEN 2,996,282
SEAL APPARATUS
Filed Jan. 9, 1959

INVENTOR
MIKLOS SAJBEN
BY Frank Cristiano Jr.

United States Patent Office 2,996,282
Patented Aug. 15, 1961

2,996,282
SEAL APPARATUS
Miklos Sajben, Media, Pa., assignor to Westinghouse Electric Corporation, East Pittsburgh, Pa., a corporation of Pennsylvania
Filed Jan. 9, 1959, Ser. No. 785,860
6 Claims. (Cl. 253—78)

This invention relates to seal apparatus and more particularly to means for sealing the annular space between wall structure bounding an opening in a vessel for pressurized elastic fluid and a pipe extending into the vessel and received in the opening.

Especially in steam turbines of double wall construction, it is desirable to obtain an effective seal between the mutually facing surfaces of the inlet steam pipe and the wall portions of the inner casing or pressure vessel bounding the opening in which the pipe is received. The better the seal, the lower will be the energy losses from steam leakage.

The effectiveness of a seal of the type set forth depends, not only on its ability to restrict the flow of leaking steam, but also on its ability to function effectively while the inner and outer casings and the pipe change their relative positions as a result of thermal expansion. The attainment of a seal having these characteristics further involves the problem of providing seal apparatus which is arranged so that the relative positions of the seal parts and the leakage flow therethrough can be readily predetermined by calculation.

In accordance with the present invention, means are provided to seal the annular space between the spaced, mutually facing, tubular surfaces of the inlet steam pipe and the wall structure bounding the inlet opening in an inner casing or a pressure vessel. The seal includes a skirt which encompasses the pipe and is spaced therefrom except at, or adjacent, the outer end of the skirt where an annular portion thereof is joined to the pipe, as by a shrink fit. Also included in the seal is a collar, one surface of which closely encompases the skirt. The other surface of the collar is provided with an annular flange which is partly received, in and carried by, an annular groove in the casing wall structure bounding the opening; otherwise, however, this other surface of the collar is spaced from the casing.

With this invention, the amount of steam leaking through the small passage between the collar and skirt from the pressure vessel is minimized, the pipe and skirt can move toward and away from the interior of the vessel, and the collar can be moved by the skirt into and out of concentric relationship with the grove as, for example, during axial, thermal expansion of the inner casing relative to the outer casing. It is also possible to predict the relative positions of the skirt and collar as a result of thermal expansion, and make reasonably accurate allowances therefor, because these parts are arranged so that they are both heated to the same temperature by the steam passing between them, as well as by steam which contacts their oppositely facing surfaces.

Figure 2:
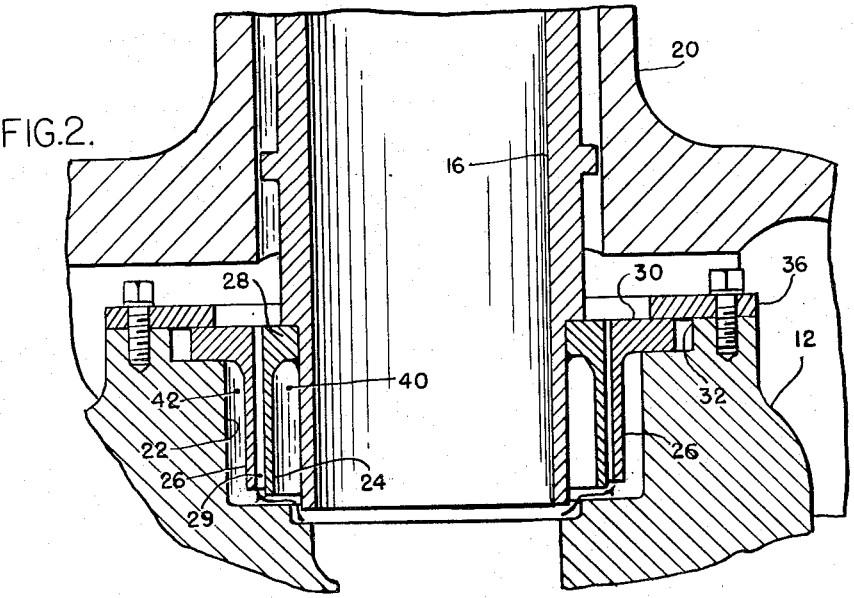

The various objects, features and advantages of the invention will appear more fully from the detailed description which follows, taken in connection with the accompanying drawings, forming a part of this application, in which:

FIG. 1 is a fragmentary view of a turbine, partly in elevation and partly in vertical section, embodying the present invention; and FIG. 2 is an enlarged vertical sectional view of a portion of FIG. 1 showing the invention in detail.

Referring to the drawing in detail, there is shown a portion of an axial-flow, multi-stage turbine including a rotor 10 and an inner pressure vessel or casing 12. Within the inner casing 12 there is provided an annular nozzle box or chamber structure 14 which is supplied with high temperature elastic fluid, such as super-heated steam, by a pipe 16. The nozzle box structure 14 is provided with nozzles 18 for admitting elastic fluid to blading carried by the rotor and the inner casing. Further provided are annular seals 19 between the rotor and inner casing parts.

The turbine is of the double-walled type, suitable to be driven by very high temperature steam, and has an outer pressure vessel or casing 20 which encloses the inner casing 12. The inlet steam pipe 16 extends through an opening in the outer casing 20 and is suitably joined thereto, as by welding. A dowel connection 21 between the casings prevents their relative rotational movement.

The inner casing 12 is provided with an inlet opening defined by a tubular wall 22 in which is received the discharge end of the pipe 16. The present invention is concerned with means for sealing the annular space between the pipe 16 and the wall 22, in order to minimize steam leakage from the inner casing 12 to the region between the inner and outer casings. The sealing means is capable of performing its sealing function while the pipe 16 undergoes thermal expansion in a direction transverse to the rotor axis and while the inner casing 12 undergoes thermal expansion relative to the outer casing 20. The movement of the inner casing 12 relative to the outer casing 20 may be axially and/or radially with respect to the rotor axis, since it is subjected to higher temperatures than the outer casing 20.

For sealing the mentioned annular space between the exterior of the pipe 16 and the wall 22, a skirt member 24 and collar 26 are provided which are preferably made of the same material. These parts are arranged so that the pipe 16, the skirt 24, the collar 26, and the wall 22 are received and encompassed one by the next, respectively. The skirt member 24 is spaced from the pipe 16, except at its outer end where an annular flange 28 extends toward the pipe, and is connected thereto by a shrink fit. The collar 26 overlaps the skirt in a direction extending longitudinally of the pipe, and it closely encompasses the skirt 24 with a clearance of between .001 to .003 inch for example, and preferably their mutually facing surfaces are smoothly finished in order to provide a smooth but restricted flow passage 29 between them. The collar 26 is spaced from the wall 22, except at the outer end of the collar where an annular flange 30 is provided. The flange 30 extends away from the pipe 16 and is partly and slidably received within an annular groove 32. The grove 32 is defined by an annular, stepped land in the wall 22 and a ring 36, the latter being suitably bolted to the wall.

All the surfaces of the parts comprising, or associated with, the seal are of tubular, preferably cylindrical, shape in order to make their manufacture and assembly convenient, and they are so shown. Also, the flanges 28 and 30 can be located adjacent, as well as at, the respective outer ends of the skirt 24 and collar 26, the location shown being only for the sake of illustration.

The diameter of the collar flange 30 at its outer periphery is less than the major diameter of the groove 32 and greater than the minor diameter of the groove. In other words, the collar flange 30 is snugly fitted between interiorly and exteriorly facing surfaces of the groove 32, but is loosely fitted with respect to the pipe-facing surfaces of the groove, so that the flange 30 is slidable in a plane transverse to the pipe axis, and remains in sealing relationship with the interiorly and exteriorly facing surfaces of the groove 32, whether the collar is in or out of concentric relationship with the groove.

This feature permits the components of the seal and neighboring parts to experience a reasonable amount of unrestricted relative movement, due to thermal expansion, without stressing these parts and without reducing the effectiveness of the seal.

During operation, the pipe 16 conducts pressurized, high temperature steam into the inner casing 12 from whence it is delivered to the blading by the nozzle box structure 14. In attempting to escape from the inner casing 12, a small portion of the steam is throttled to lower pressures as it flows through the passage 29 between the skirt 24 and collar 26. At the same time, still other portions of steam are trapped in a chamber 40 between the skirt 24 and pipe 16, and a chamber 42 between the collar 26 and wall structure 22. The pressure difference between oppositely and mutually facing surfaces of the skirt 24 and collar 26 forces their mutually facing surfaces toward each other. It may be desirable for some applications, therefore, to make all but the flanges of the skirt and the collar thin-walled and flexible so that the aforementioned pressure difference can be effective to reduce the flow area of the passage 29. The trapped steam in chamber 42 also serves to force the collar flange 30 outwardly into sealing contact with the ring 36. Thus, the pressure forces of the steam are used to advantage.

Coping with the thermal effects of high temperature steam is the most difficult problem for which this invention provides a solution. Unlike prior art arrangements, when the parts of the present arrangement undergo thermal expansion the relative positions of their mutually facing surfaces are virtually unchanged. Stated another way, the "hot clearance" between seal parts is much the same as when the parts are cold, and this is the case regardless of the temperature to which they are heated, as will be explained.

During operation, the skirt 24 and the collar 26 are heated to a small extent at their oppositely facing surfaces by the trapped steam, and chiefly at their mutually facing surfaces by the leakage steam traveling at high velocity through the passage 29. This leakage steam is the predominant heat source for the seal parts and these parts will assume, at any given point in the passage 29, the temperature of the steam thereat. The pipe 16 and the wall 22 are arranged so that they have a negligible influence on the temperature of the seal parts. Thus, the complexity of calculations to determine the amount of thermal expansion of these parts is reduced. Furthermore, since the seal parts are of similar size and like material, adjacent annular portions of the respective parts will experience a similar amount of thermal expansion; and it follows that the clearance between adjacent annular portions will not change appreciably.

While the invention has been shown in but one form, it will be obvious to those skilled in the art that it is not so limited, but is susceptible of various changes and modifications without departing from the spirit thereof.

What is claimed is:

1. In a pressure vessel having a wall structure defining an inlet opening and an elongated pipe received in said opening and extending toward the interior of said vessel, means for sealing the space between the pipe and said wall structure comprising: a skirt and a collar; said pipe, said skirt, said collar, and said wall structure being encompassed and received one by the next, respectively; said skirt having an annular portion at its outer end secured to the exterior of said pipe and another annular portion including the inner end thereof which extends from the annular portion toward the interior of said vessel and is spaced from the pipe, the collar and the wall structure; said collar closely encompassing said skirt and having at its outer end an annular portion connected to said wall structure, said collar having another portion including the inner end thereof which is spaced from said wall structure, the pipe, and the collar, and extends toward the interior of said vessel in overlapping relationship with said other portion of said skirt in a direction extending longitudinally of the pipe.

2. In a pressure vessel having wall structure defining an inlet opening and an elongated pipe disposed in said opening and extending toward the interior of said vessel, means for sealing the space between the pipe and said wall structure comprising: a tubular skirt and a tubular collar; said pipe, said skirt, said collar, and said wall structure being encompassed and received one by the next, respectively; said skirt having an annular portion at its outer end tightly fitted to the exterior of said pipe and another annular portion including the inner end thereof which extends longitudinally of the pipe from the fit toward the interior of said vessel and is spaced from the pipe, the collar, and wall structure to provide between said skirt and said pipe a chamber which is open to the interior of said vessel; said collar closely encompassing said skirt and having at its outer end an annular flange portion which extends away from said pipe, said wall structure being provided with an annular groove for receiving in sealing relationship at least a portion of said collar flange, said collar having another annular portion including the inner end thereof which extends toward the interior of said vessel and is spaced from said wall structure, said skirt, and said pipe to provide between said collar and said wall structure a chamber which is open to the interior of said vessel.

3. In a pressure vessel having wall structure defining an inlet opening and an elongated pipe extending toward the interior of said vessel and received in said opening, means for sealing the space between the pipe and said wall structure against leakage away from the interior of said vessel and in a direction longitudinally of said pipe comprising: a skirt encompassing said pipe in said space and joined at its outer end to the exterior of said pipe, said skirt extending from the joint toward the interior of said vessel and being spaced from the pipe at and adjacent the inner end thereof to define between said pipe and said skirt a chamber which is open to the interior of said vessel, and a collar closely encompassing said skirt to define a restricted flow passage therebetween and having at its outer end an annular portion extending away from said pipe, said collar having another portion extending from its outer end toward the interior of said vessel and being spaced from said wall structure, said skirt, and said pipe at and adjacent the inner end thereof to define between said collar and said wall structure a chamber which is open to the interior of said vessel, said wall structure being provided with an annular groove in which said annular portion of said collar is received said skirt and said collar having mutually facing surfaces which are smoothly finished to provide a smooth flow passage between them.

4. In a pressure vessel having wall structure defining an inlet opening and a pipe received in said opening and extending toward the interior of said vessel, means for sealing the space between the pipe and said wall structure comprising: a tubular skirt encompassing said pipe in said space and having one portion thereof adjacent its outer end joined to the exterior of said pipe, said skirt having another portion including the inner end thereof extending from said one portion toward the interior of said vessel in spaced relation to said pipe and said wall structure to define between said pipe and said skirt a chamber open to the interior of said vessel, and a tubular collar closely encompassing said skirt and having an annular flange portion at its outer end, said collar extending from its outer end toward the interior of said vessel and being spaced from said wall structure, said pipe and said skirt at and adjacent the inner end thereof to define between said collar and said wall structure a chamber which is open to the interior of said vessel, said skirt and said collar being made of similar metals, said wall structure being provided with an annular groove in which said flange portion of said collar is received.

5. In a pressure vessel having wall structure defining an inlet opening and a pipe received in said opening, means for sealing the space between the pipe and said wall structure comprising: a flexible tubular skirt and a flexible tubular collar; said pipe, said skirt, said collar, and said wall structure being received one by the next, respectively; said skirt having at its outer end an annular portion secured to said pipe, said skirt having another portion including the inner end thereof which is cylindrical and extends from the annular portion toward the interior of said vessel in spaced relation to said pipe, said collar and said wall structure to define between said pipe and said skirt a chamber which is open to the interior of said vessel; said wall structure having means defining an annular groove in the pipe-facing surfaces thereof, said collar closely encompassing said skirt and having an annular flange portion at its outer end which is received in said groove, said collar having another portion including the inner end thereof which is cylindrical and spaced from said skirt, said pipe and said wall structure to define between said collar and said wall structure a chamber which is open to the interior of said vessel, said flange portion of said collar being snugly fitted between surfaces of said groove which facing exteriorly and interiorly of said vessel and being loosely fitted with respect to pipe-facing surfaces of said groove.

6. In a steam turbine, a rotor, an outer casing provided with an opening therein, an inner casing having a nozzle chamber and a wall defining an inlet opening communicating with said chamber, a pipe anchored to said outer casing and extending through the opening therein, said pipe being received in said opening of said inner casing for conducting steam to said nozzle chamber, means for sealing the space between the pipe and said wall: a flexible tubular skirt and a flexible tubular collar; said pipe, said skirt, said collar, and said wall being received one by the next, respectively; said skirt having at its outer end an annular portion secured to said pipe, said skirt having another portion including the inner end thereof which extends from the annular portion toward the interior of said vessel in spaced relation to said pipe, said collar, and said wall; means defining an annular groove in said inner casing, said collar closely encompassing said skirt and having an annular flange portion at its outer end which is received in said groove, said collar having another portion including the inner end thereof which is spaced from said skirt, said wall, and said pipe; said flange portion of said collar being slidably fitted between opposed surfaces of said groove for movement in a plane transverse to the pipe axis.

References Cited in the file of this patent
UNITED STATES PATENTS

| | | |
|---|---|---|
| 2,367,134 | Mierley | Jan. 9, 1945 |
| 2,649,315 | Ipsen | Aug. 18, 1953 |

FOREIGN PATENTS

| | | |
|---|---|---|
| 534,044 | Italy | Oct. 5, 1955 |